(12) United States Patent
Ciciriello (10) Patent No.: US 11,698,027 B2
(45) Date of Patent: Jul. 11, 2023

(54) SYSTEM FOR VIBRATION MANAGEMENT IN ROTATING MACHINERY

(71) Applicant: Rolls-Royce Deutschland Ltd & Co KG, Blankenfelde-Mahlow (DE)

(72) Inventor: Lucia Ciciriello, Berlin (DE)

(73) Assignee: ROLLS-ROYCE DEUTSCHLAND LTD & CO KG, Blankendfelde (DE)

(*) Notice: Subject to any disclaimer, the term of this patent is extended or adjusted under 35 U.S.C. 154(b) by 0 days.

(21) Appl. No.: 17/737,244

(22) Filed: May 5, 2022

(65) Prior Publication Data

US 2022/0364508 A1 Nov. 17, 2022

(30) Foreign Application Priority Data

May 17, 2021 (EP) .................................... 21174018

(51) Int. Cl.
*F02C 7/06* (2006.01)
*F02C 7/36* (2006.01)

(52) U.S. Cl.
CPC .................. *F02C 7/06* (2013.01); *F02C 7/36* (2013.01); *F05D 2220/323* (2013.01);
(Continued)

(58) Field of Classification Search
CPC ......... F05D 2220/323; F05D 2240/515; F05D 2260/96; F05D 2270/334; F05D 2270/44; F02C 7/06; F01D 25/16; F01D 25/164; F01D 25/10; F01D 25/04; F16F 15/03; F16F 15/005; F16F 15/18
See application file for complete search history.

(56) References Cited

U.S. PATENT DOCUMENTS 4,141,604 A * 2/1979 Habermann ........ F16C 32/0402
310/90.5
5,678,460 A 10/1997 Walkowc
(Continued)

FOREIGN PATENT DOCUMENTS

EP  1672244 A1  6/2006
EP  1868289 A1  12/2007
EP  3480939 A1  5/2019

OTHER PUBLICATIONS https://www.designworldonline.com/the-ultimate-guide-to-vibration-analysis/, The Ultimate Guide to Vibration Analysis, S. Hanly; Nov. 12, 2018.*

(Continued)

*Primary Examiner* — Todd E Manahan
*Assistant Examiner* — Rodolphe Andre Chabreyrie
(74) *Attorney, Agent, or Firm* — Shuttleworth & Ingersoll, PLC; Timothy J. Klima (57) ABSTRACT

A system (1) for vibration management comprises a stator (24, 45); a rotor (26) being mounted rotatably with respect to the stator (24, 45) about a rotational axis (9); one or more active devices (41A-41C) adapted to apply forces and/or moments on the rotor (26) and/or on the stator (24, 45); at least two sensors (42) for measuring vibrational parameter values with respect to two or more different positions, particularly along the rotational axis (9); and a controller (44) adapted to provide control signals to the one or more active devices (41A-41C) based on the vibrational parameter values of the at least two sensors (42) and on the respective position.

16 Claims, 6 Drawing Sheets

(52) U.S. Cl.
CPC .... *F05D 2240/515* (2013.01); *F05D 2260/96* (2013.01); *F05D 2270/334* (2013.01); *F05D 2270/44* (2013.01)

(56) References Cited

U.S. PATENT DOCUMENTS

| | | | |
|---|---|---|---|
| 6,378,293 B1* | 4/2002 | Care | F16C 32/0474 |
| | | | 310/90.5 |
| 2012/0229290 A1* | 9/2012 | Gerez | G01H 1/006 |
| | | | 340/669 |
| 2018/0128342 A1* | 5/2018 | Ghosh | F16C 27/045 |
| 2018/0171823 A1 | 6/2018 | Yoshida et al. | |
| 2019/0128324 A1* | 5/2019 | Ciciriello | F16C 17/026 |
| 2019/0360462 A1 | 11/2019 | Epstein | |
| 2020/0056677 A1 | 2/2020 | Schmidt et al. | |
| 2021/0372478 A1* | 12/2021 | Ciciriello | H02P 21/05 |
| 2022/0065688 A1* | 3/2022 | Ciciriello | F01D 21/003 |
| 2022/0290718 A1* | 9/2022 | Jolly | F16C 25/086 |

OTHER PUBLICATIONS

European Search Report dated Nov. 22, 2021 from counterpart European Patent Appllication No. 21 174 018.8.

\* cited by examiner

SYSTEM FOR VIBRATION MANAGEMENT IN ROTATING MACHINERY

This application claims priority to European Patent Application EP 21174018.8 filed May 17, 2021, the entirety of which is incorporated by reference herein.

The present disclosure relates to a system for vibration management and to an engine with such a system.

Rotating machinery such as gas turbine engines or electrical engines, comprise one or more rotors, e.g., shafts. On the shafts of engines, for example, compressors, electrical motors and/or turbines are mounted to provide for rotation and thrust. In general, at least two bearings are provided to allow for a controlled rotation of the shafts. In some cases, several shafts are provided, which may be coaxial, i.e. with two or more shafts rotating about a common axis. Similar arrangements are also provided in other machine types, in particular other types of aircraft engines.

A common problem in the field of such machines is controlling the level of vibration. Vibration may be caused by imbalances of the shaft and supported rotatable elements, such as compressor and turbine discs and blades, and also by external forcing such as aircraft maneuvers and aerodynamic forces. Also, in multi-shaft engines, vibrations generated by forces applied on one shaft may be able to excite one or more of the other shafts to vibrate, for instance exciting resonance or orbits. This particular typology of vibrations is known as cross-shaft vibration. Damping systems such as fluid dampers are commonly employed to reduce vibrations. Typically, the performance of such dampers has limitations.

Further, in case that vibration exceed a certain level, operation of the rotating machinery may have to be changed to a lower or higher speed in order to mistune a resonant condition or to reduce orbits of the rotor(s) that can appear at frequencies coincident or different from the frequency of the rotor angular velocity, or to provide less thrust.

It is an object to improve operational characteristics of rotating machinery.

According to a first aspect there is provided a system for vibration management at rotating machinery. The system comprises a stator, a rotor, one or more active devices, at least two sensors and a controller. The rotor is mounted rotatable about a rotational axis with respect to the stator. Each of the one or more active devices is configured to apply linear forces and/or moments on the rotor and/or on the stator. The at least two sensors may be arranged at two or more different positions along the rotational axis, around the rotational axis and/or radial distances to the rotational axis. The at least two sensors are adapted for measuring vibrational parameter values with respect to two or more different positions along the rotational axis, around the rotational axis and/or radial distances to the rotational axis. The controller is adapted to provide control signals to the one or more active devices based on the vibrational parameter values of the at least two sensors and based on the position, e.g., of the respective sensor along the rotational axis, in radial direction and/or in circumferential direction.

By determining not just one single amplitude of vibration, but location-dependent vibration parameter values, e.g., values of vibration amplitudes (and, optionally, of ratios of these values), it becomes possible to determine in which of a plurality of normal modes the rotor is oscillating. Indeed, even if the modes are not normal but coupled (e.g., complex modes due to rotating damping) the system would still work. This determination allows to more efficiently controlling one or more active devices, e.g., based upon the identification of a shape or pattern, particularly of a mode, of displacement.

For example, if an active device is located at a position along the rotational axis at which the currently oscillating mode has a node, so that the deflection by the mode of oscillation of the rotor at this location is zero, activation of this active device to apply a radial force of the rotor at this location may not be advantageous to reduce the vibration in this mode. Rather, another active device may be chosen to exert a force, or other measures may be preferred, such as reduction of power, or decrease or increase of speed or the rotor. On the other hand, if the location of the active device is, e.g., in the region of a maximum of deflection of the normal mode, an activation of the active device may be particularly efficient. That is, using the combined information (for instance, as the ratio) about the two or more positions allows to significantly improve the operational characteristics of the rotating machinery having the described system. For example, the controller is adapted to calculate various normal modes of the rotor, or stores a look-up table with various normal modes or the rotor. For example, the controller stores various mode shapes of the rotor. Further, the controller may be adapted to activate/deactivate the force exerted in one or more specific locations based upon the modes (or ratios) identified by the sensor(s) (e.g., a sensor array). It is worth noting that the displacement (or vibration parameters) can be a superposition of different modes acting at the same time. With ratios measured with respect to the sensor locations, it is possible to identify and compensate (and thus to manage) with the controller more than one mode of vibration at a time. The vibrational parameter values are, e.g., values of a displacement of the rotor (and/or stator), e.g., values of an amplitude and/or of a frequency of the displacement of the rotor. The controller may use an FEM model and/or look-up table for any two locations or directions. The sensors may be or comprise proximity sensors, vibration sensors or the like. By applying forces on the stator and/or one the rotor(s), a stiffness of the stator can be modified. The two or more sensors could be located at two different axial, radial (e.g. having the same axial location) and/or circumferential positions of the rotor or of the stator. Also, the two or more sensors can be at the same axial, radial and circumferential location, but the two (or more) sensors measure in different directions (e.g., are oriented differently). The sensors can be arranged on the rotor or a housing (e.g., a casing, e.g., the stator), and may include strain gauges.

According to a second aspect there is provided a system for vibration management. Optionally, this system is configured in accordance with the system of the first aspect. The system of the second aspect comprises a stator, a rotor, at least two active devices and a controller. The rotor is mounted rotatable about a rotational axis with respect to the stator. Each of the two or more active devices is configured to apply linear forces and/or moments on the rotor and/or on the stator, and the two or more active devices are arranged at two or more different positions, e.g., along the rotational axis in radial direction with respect to the rotational axis and/or around the rotational axis. The controller is adapted to receive operating parameter values and/or vibrational parameter values. The controller is further adapted to provide control signals to the two or more active devices based on the operating parameter values and/or the vibrational parameter values and based on the position of the respective active device.

By applying forces location-dependent, it becomes possible to more efficiently counteract vibrations of the rotor in normal modes and to more efficiently control two or more active devices. For example, if one of the active devices is located at a position (e.g., along the rotational axis) at which the currently oscillating mode has a node, so that the deflection by the mode of oscillation of the rotor at this location is zero, activation of this active device to apply a radial force of the rotor at this location may not be advantageous to reduce the vibration in this mode. Rather, another one of the active devices may be chosen to exert a force. Particularly, if the location of the other active device is, e.g., in the region of a maximum of deflection of the normal mode, an activation of this active device may be particularly efficient. It is worth noting that having a multitude of devices, a device that is positioned in a location that is not highly effective to avoid the vibration (particularly by changing the modal stiffness) due to a certain (first) mode (at a first frequency), however, can be the most effective to avoid vibration due to another (second) mode (at a second frequency). That is, using the information about the two or more positions allows to significantly improve the operational characteristics of the rotating machinery having the described system. For example, the controller is adapted to calculate various normal modes of the rotor (and/or stator), or stores a look-up table with various normal modes or the rotor. For example, the controller stores various mode shapes of the rotor (and/or stator). Further, the controller may be adapted to determine an actual mode shape by analysis of the vibrational parameter values and/or by analysis of the operational parameter values, e.g., values of a speed and/or power and/or torque. The active devices may additionally act as sensors for measuring the vibrational parameter values, e.g., vibration amplitudes. The one or more active devices may each be positioned between the rotor and the stator, or between two or more rotors, or between two or more stators. It is worth noting that the optional application of adaptive magnetic forces can also work on static parts (e.g., the stator) to mistune resonances and reduce vibration, or control relative displacements. The one or more active devices may be configured to directly or indirectly act on the rotor(s) and/or stator(s). For example, the active device(s) could (some or each) be a linear actuator (e.g., an oil piston) or a rotating actuator (to exert a moment).

Optionally, the operating parameter values indicate set points for the operation of the controller. Alternatively or in addition, the operating parameter values may be indicative of at least one of a speed (e.g., of the rotor), one or more electrical current(s) (e.g. supplied to the active device(s)) and a torque (e.g., transmitted by the rotor).

When the system comprises more than one active device, the active devices can be displaced axially, radially and/or circumferentially with respect to the rotational axis. Several, e.g., two, three or four active devices may be located at the same axial location (and optionally at the same radial location), but at different circumferential locations. That is, several active devices may be distributed around the rotational axis. For example, compared with one another, these active devices may exert radial forces on the rotor in different directions. Such active devices located at the same axial location, but at different circumferential locations, may also collectively be referred to as an active device arrangement. In the active device arrangement, each active device can be controlled independently of the others (optionally, all active devices of the active device arrangement are controllable simultaneously). This allows to optimize a vibration reduction at each engine speed-power condition both in terms of locations and time sequence. Alternatively or in addition, one active device may (e.g., fully) encompass the rotor and/or stator and/or one active device may comprise more than one coils, e.g., arranged at opposite locations with respect to the rotor. It may comprise more than one electric coil which may be controlled collectively (e.g., not individually).

The controller may be adapted to provide the control signals to the one (or two) or more active devices based on a ratio of two values associated with the two different positions (e.g., along, around, or radially with respect to the rotational axis). By using a ratio, a dimensionless value is obtained what enables the application to identify the precise operational mode shapes regardless the magnitude of the vibration. Further, using a ratio allows for a quick and more effective comparison with values that identify shapes stored in a look-up table (LUT). The reason is that resonances consist of the structure vibrating following defined modes of vibration (mode shapes or Eigen vectors) which are in fact defined by ratios of displacements across different positions and directions. Optionally, the two values used for the ratio are the vibrational parameter values associated with the two positions, or values of a stiffness (e.g., radial, axial, tangential or a combination thereof) of the rotor and/or the stator. Optionally, the control signals are provided by the controller exclusively based upon speed or any measured parameter. The system would work also without feedback, like in a switch, activated versus speed, elapsed time or any other measured parameter.

The rotor and/or the stator have mode shapes with at least one deflection maximum at a position along the rotational axis or along a radial or tangential direction (e.g. for a disk). For example, the rotor has a first mode shape with one maximum, a second mode shape with two maxima and a third mode shape with three maxima. At least one of the active devices may be arranged at the position of such a maximum along the rotational axis. For example, the system comprises active devices at the maxima of (e.g., each of) the one, two or three (or n, where n is an integer, e.g. 5 or 10) lowest-order mode shapes (or at least one of the maxima of each of these mode shapes). However, none of the devices is necessarily required to be placed at the location of maximum displacement for a mode that is the target of a resonance mistuning, for the system to work. In general, in a system, e.g., of an aircraft engine, the modes of vibration (eigenvectors) can be complex three-dimensional shapes, which include not only linear displacements but also rotations. It is not necessary to apply an active device at the location of the maximum displacement. However, counteracting a vibrational mode shape at the location or in the direction of the maximum displacement can be most effective.

The rotor is mounted rotatable about the rotational axis with respect to the stator by means of one or more contact bearings, e.g. one or more rolling-element bearings, e.g. one or more ball bearings, and/or one or more journal bearings, and/or by means of one or more air bearings. These bearings are adapted for supporting the entire load of the rotor in operation and so as to carry the rotor (safely) at any speed-power condition (e.g., at an emergency landing, shaft/bearing seizure, failure of the device control systems, etc.). However, weight optimization in the rotor(s) and its supports are possible taking advantage from the alleviating force that the device is able to supply in nominal conditions. The rotor is operable even if the active devices are switched off. For example, the system is a part of an engine, e.g. of an aircraft. The engine is operational even in case of a failure of the controller and/or the active devices. In other words, the active devices are not necessary for an operation of the rotor, but by use of the active devices the operation of the rotor can be significantly improved. A redesign of the system is conceivable to achieve weight reduction on rotors, bearings and stators, and the bearings can be designed to a minimal dimension that will still allow an aircraft to accomplish emergency operations in safety (if the controller fails, or the active devices(s) become unable to operate). Thus, the function of carrying the load (by the contact bearings), and of managing vibrations (by the controller and active devices) are separated. By this, the active devices can manage vibrations much more efficiently. The active devices are no magnetic bearings. Further, the controller is a dedicated controller to control the active devices, and is separate and independent of other control systems for controlling the operation of the rotor. Thereby, the controller may be optimized for this function and, e.g., does not have to share computing capacity with other functionalities.

Optionally, the controller is further adapted to receive and/or determine an indication of a change of the operating parameter versus time, e.g. a first or second derivative of the operating parameter. The controller may be adapted to determine (in particular, predict) a point in time when a resonance condition will be met, e.g., based on the operating parameter (in particular in a ratio of values, e.g. of values at different points in time) and the change of the operating parameter. For example, the resonance condition may be met at or in the vicinity of a modal frequency. The controller may be adapted to control at least one of the active devices at a time offset prior to the determined point in time. The time offset may be predetermined or calculated by the control system. This allows not simply to react on large actual vibrations, e.g., vibrations exceeding a threshold, but to predict strong vibrations and provide control signals to the active devices prior to the vibrations actually occurring. Hence, the vibrations may be counteracted even before they occur, and this allows for a particularly effective reduction of vibrations.

The system may comprise at least two active devices (optionally, at least two active device arrangements), wherein the controller is adapted to detect and identify a resonance condition, to select a subset of one or more active devices out of the at least two active devices based on the identified resonance condition (or multiple resonance conditions comprising more than one resonance excited contemporarily), and to provide control signals to the subset of active devices. The subset of active devices includes at least one of the at least two active devices, and less than the at least two active devices. The active devices may be distributed along the rotational axis. For example, the system may comprise three, four or more active devices (optionally, at least two active device arrangements), e.g., ten active devices. Only those active devices are provided with control signals to exert forces, which the controller determines to have the best effect in reducing vibrations. Those may be the active devices (optionally, at least two active device arrangements) arranged at deflection maxima in one or more resonance conditions. The system is able to manage (particularly mistune) multiple resonance conditions where more than one resonance (that are generating vibration at different frequencies) are contemporarily excited. The ratio used by the controller may be determined by dividing two parameter changes from different modes of vibration.

The system may comprise at least two active devices (optionally, at least two active device arrangements), wherein the controller is adapted to select a subset of one or more active devices (or active device arrangements) out of the at least two active devices (or active device arrangements) based on the received operating parameter value. The controller may be adapted to provide control signals to the subset of one or more active devices. The subset of active devices includes at least one of the at least two active devices, and less than the at least two active devices.

Optionally, the controller is adapted to provide control signals to at least one of the active devices to excite a vibration of the rotor. Thus, the system may not only be adapted to reduce vibrations, but also to create vibrations. By this, ice formations on the rotor, e.g., on blades mounted on the rotor, can be removed. Thus, the system may provide a dual use what can significantly improve the overall performance while keeping the weight at a minimum.

The controller may be adapted to provide the control signals to at least one of the active devices to apply the forces on the rotor and/or on the stator based on a target stiffness of the rotor and/or of the stator. This allows an efficient control and allows a control of cross-shaft excitations.

The forces that the one, two or more active devices are adapted to apply may be non-contact forces, e.g., magnetic forces or electric forces, or forces generated by compressed air. By this, movable parts that themselves could be subject to wear may be avoided. Further, such active devices allow for a particularly precise control. Also, the adoption of non-contact forces to mistune responses does not necessarily introduce additional mass on the rotor, and allows to maximize the variation of the natural frequency, which is proportional to the square root of modal stiffness to modal mass. The controller may regulate the non-contact forces (in particular by regulating the magnetic flux) to set the target value. It is worth noting that by applying non-contact forces a clearance between the rotor and the stator may be enlarged or decreased. The system may provide an active non-contact stiffness control, optionally including monitoring and compensation of gap-dependent forces and vibration. According to an embodiment one or more, e.g. each, of the active devices comprises one or more electric coils.

Optionally, one, some or all of the at least one, two or more active devices (or active device arrangements) is/are adapted to exert radial forces with respect to the rotational axis. Alternatively or in addition, one, some or all of the at least one, two or more active devices is/are adapted to exert axial forces with respect to the rotational axis. This allows to counteract (or excite) vibrations in radial and/or axial directions.

Alternatively or in addition, one, some or all of the at least one, two or more active devices (or active device arrangements) is/are adapted to exert tangential forces with respect to the rotational axis. This allows to counteract (or excite) vibrations circumferential direction. Optionally, the system comprises one or more active devices for exerting radial forces, one or more active devices for exerting axial forces and one or more active devices for exerting tangential forces. An active device for exerting tangential forces may also be used for generating thrust, and, more generally, power, having the function of an electrical motor or generator (for absorbing power, e.g., to break or generate current).

Optionally, each of two or more active devices (optionally, at least two active device arrangements) is adapted to exert tangential forces on the rotor with respect to the rotational axis. Optionally, these two active devices may provide thrust. For example, these active devices may be the only (or major) power source for generating thrust of an engine comprising the system.

According to an aspect, an engine, in particular an engine for an aircraft, is provided. The engine comprises the system according to any aspect or embodiment described herein.

For example, the engine may be an electrical engine, a gas turbine engine or a hybrid engine. Thus, particularly a hybrid electric engine is possible where active devices as electrical drives are split in modules distributed at several (advantageous) locations between housing(s) and rotor(s) of aircraft modules.

According to another aspect, an engine, in particular an engine for an aircraft, is provided, which may be an electrical engine or a hybrid electrical engine. The engine comprises a system comprising a stator, a rotor being mounted rotatably with respect to the stator about a rotational axis, one or more active devices adapted to apply forces and/or moments on the rotor and/or on the stator, and at least two sensors for measuring vibrational parameter values with respect to two or more different positions, particularly along the rotational axis. Optionally, the system of the engine comprises a controller as described above. The system of this aspect may comprise any or all of the features of the systems described above.

According to another aspect, an engine, in particular an engine for an aircraft, is provided, which may be an electrical engine or a hybrid-electrical engine. The engine comprises a system comprising a stator, a rotor being mounted rotatably with respect to the stator about a rotational axis, and at least two (e.g., three, four or more) active devices arranged at two or more different positions, particularly displaced along the rotational axis, and each being configured to apply forces and/or moments on the rotor and/or on the stator. Optionally, the system of the engine comprises a controller as described above. The rotor may be a shaft, e.g., driving an assembly to generate a flow of air, e.g., a propeller, fan or compressor. The active devices may be adapted to generate torque. Thus, electrical power may be distributed along a rotor shaft. Optionally, the rotor and the active devices are arranged in a coaxial cylinder, that can be an engine housing, which may have structural reinforcements. The coaxial cylinder may be a turbine casing or a fan case housing a fan of the engine. A distributed power allows a better control of the dynamic response of the system, e.g. in case of shaft seizure, and allows a better mistuning of complex torsional modes. Such a driveline with distributed power integrated in the casing can have less critical failure modes. The system of this aspect may comprise any or all of the features of the systems described above.

According to a further aspect, a method for vibration management applying the system of any aspect of embodiment described herein is provided. The method includes providing, by the controller, control signals to the one or more active devices based on the vibrational parameter values of the at least two sensors and on the respective position and/or receiving, by the controller, operating parameter values and/or vibrational parameter values and providing, by the controller, control signals to at least two active devices based on the operating parameter values and/or the vibrational parameter values and the position of the respective active device.

Embodiments will now be described by way of example only, with reference to the schematic Figures, in which.

Figure 1:
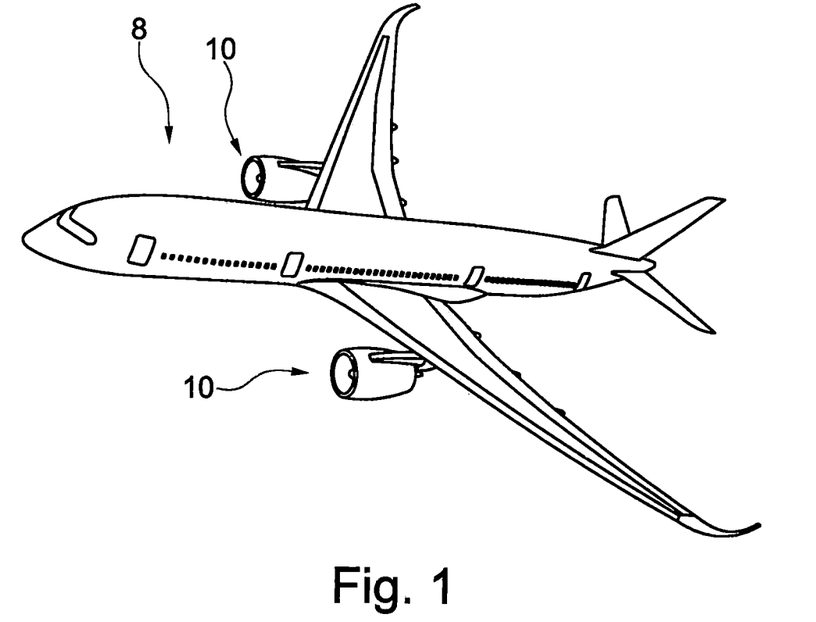
FIG. 1 is an aircraft having a plurality of engines.

FIG. 1 shows an aircraft 8 in the form of a passenger aircraft. The aircraft 8 comprises several (i.e., two) gas turbine engines 10 in accordance with FIG. 2.

Figure 2:
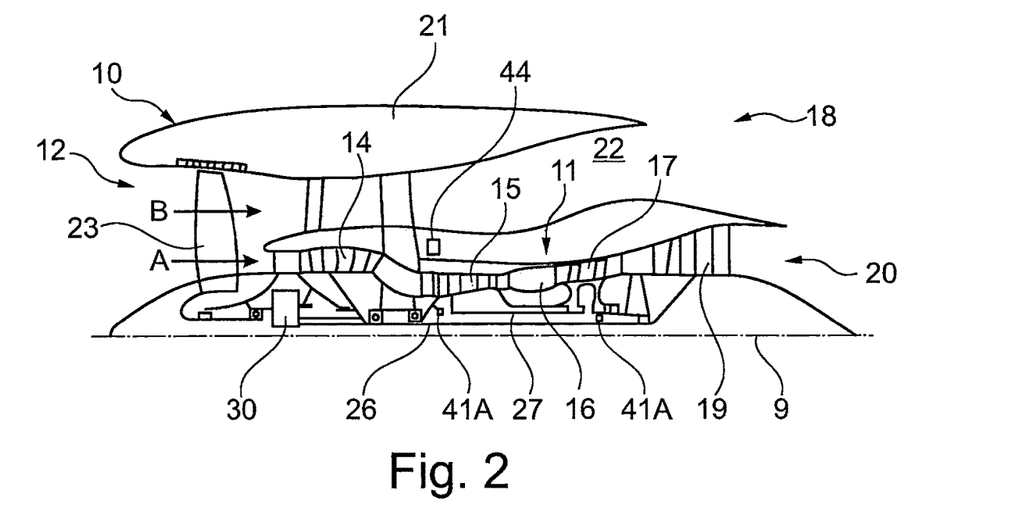
FIG. 2 is a sectional side view of a gas turbine engine.

FIG. 2 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 3:
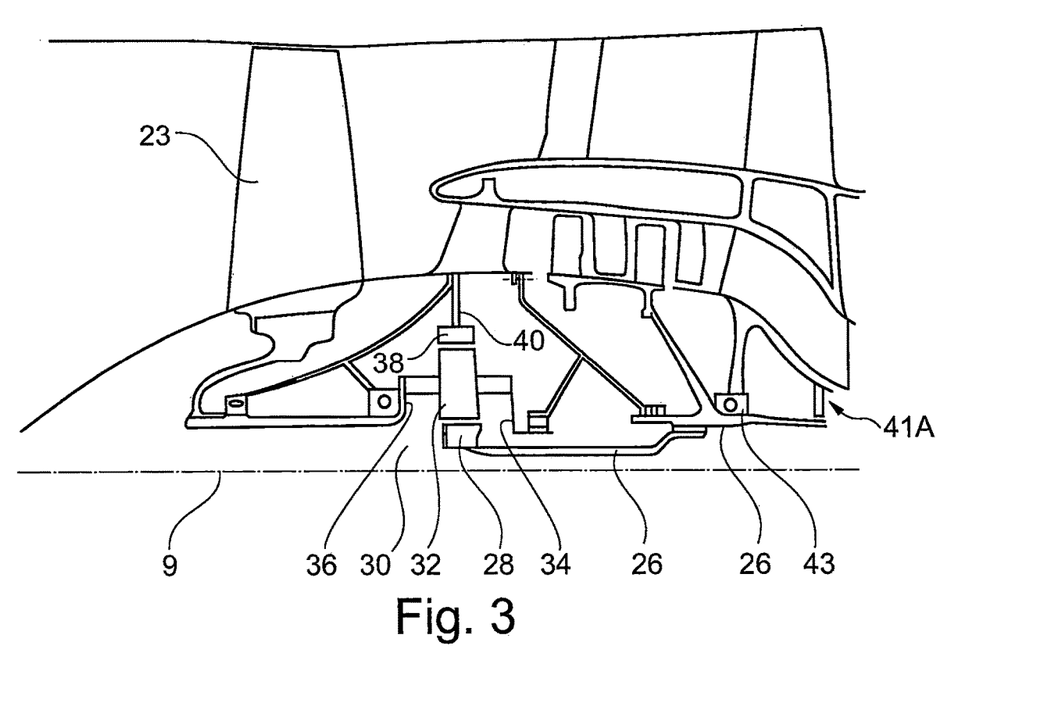
FIG. 3 is a close up sectional side view of an upstream portion of a gas turbine engine.

An exemplary arrangement for a geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The stationary support structure 24 serves as a stator, the shaft 26 serves as a rotor. As shown in FIGS. 2 and 3, the gas turbine engine 10 also comprises contact bearings 43 and active devices 41A for the shaft 26. The active devices 41A are adapted to apply forces on the shaft 26, in the present example axial forces.

A controller 44 is adapted to provide control signals to the active devices 41A based on vibrational parameter values of one or more sensors arranged at the gas turbine engine, and on the position of the respective sensor along the rotational axis. In this example, the active devices 41A themselves serve as sensors. The active devices 41A comprises electric coils to create magnetic fields, and these coils are also used to detect vibrations of the nearby shaft 26.

Further, the controller 44 is adapted to receive operating parameter values, namely speed of the shaft 26 and transmitted power and/or torque, and to provide control signals to the active devices 41A based on the operating parameter values and/or the vibrational parameter values, and based on the position of the respective active device.

The shaft 26, stationary support structure 24, active devices 41A (which in this example also act as sensors while alternatively dedicated sensors may be provided instead or in addition) and the controller 44 together serve as a system for vibration management.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
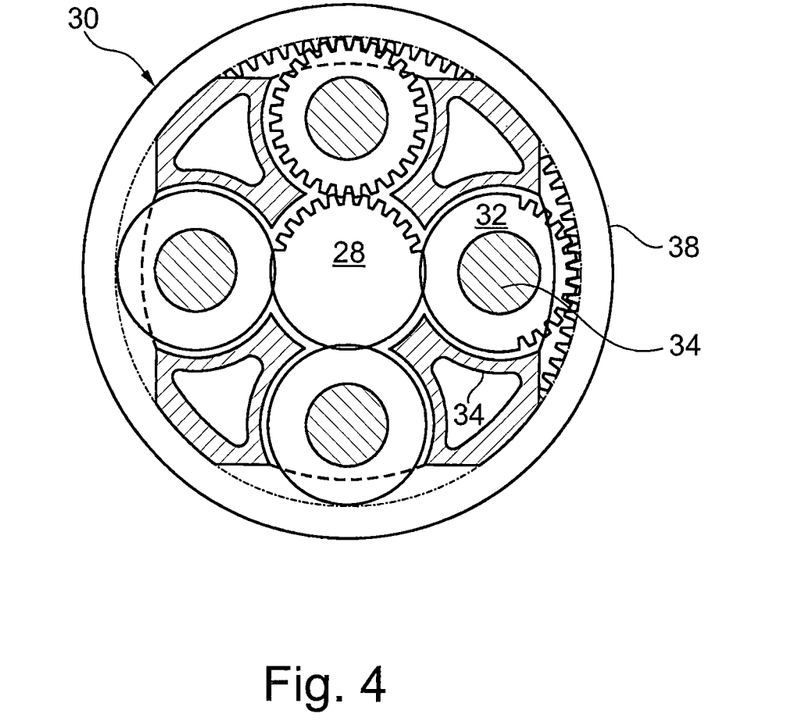
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

Figure 5A:
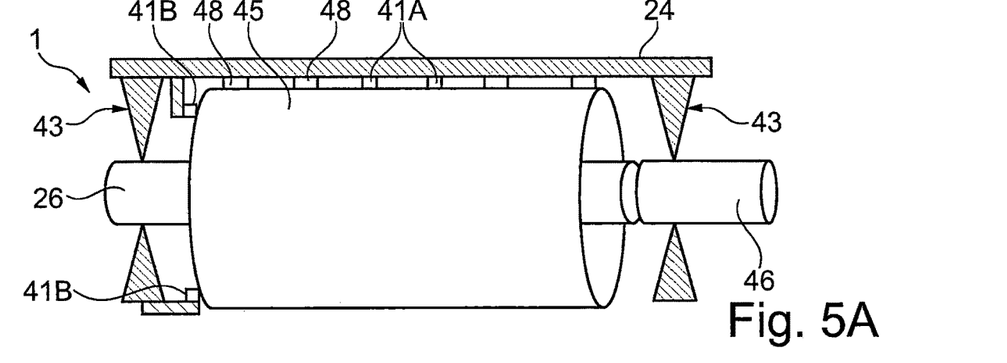
FIGS. 5A and 5B are views of a system for vibration management.
Figure 5B:
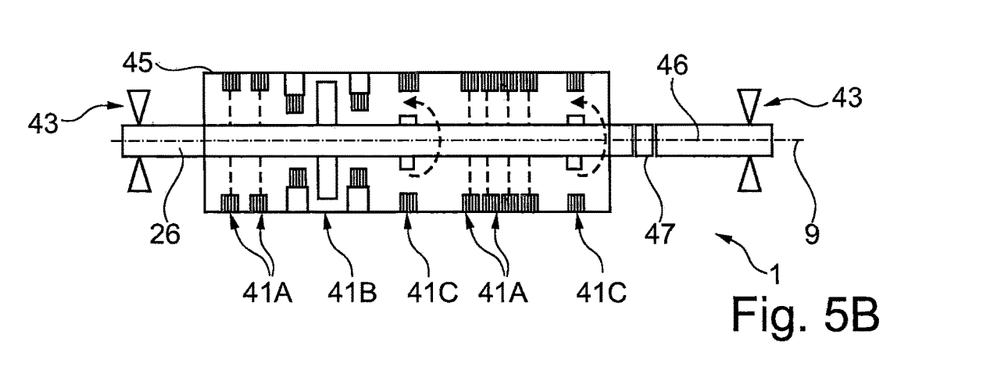

Turning now to FIGS. 5A and 5B, a system 1 for vibration management will be described. The system may be part of the gas turbine engine 10 described above. Further, the system may be part of an electrical engine, e.g., for the aircraft 8 of FIG. 1. As will be described below, optionally, the system 1 may be simply equipped with a propeller to serve as engine.

The system 1 comprises a stator comprising stationary support structure 24. Contact bearings 43 rotatably support a rotor in the form of a shaft 26. In the present example, the rotor comprises a major section and a further rotor section 46. The rotor section 46 is coupled to the major section via a gearbox 47, or, more generally, by means of one or more flexible or teethed couplings. Optionally, more than the two contact bearings 43 shown in FIGS. 5A and 5B are provided, e.g., two for each section of the shaft 26.

The stator of system 1 further comprises a housing 45 mounted on the stationary support structure 24. In the present example, the housing 45 is cylindrical. The housing is arranged coaxially with the shaft 26. The housing 45 surrounds the shaft 26. The housing 45 is connected to the stationary support structure via reinforcements 48, but this is just an example. Optionally, the reinforcements 48 may be or comprise active devices, such as active devices 41A, 41B or 41C. Optionally, active devices 41A, 41B are arranged on the housing 45. Stationary support structure 24 may correspond the stationary support structure 24 shown in FIG. 2. Alternatively, it is different therefrom. Stationary support structure 24 may be a frame of the aircraft 8, e.g., of wing thereof. The housing 45 may be an engine housing, e.g., a turbine case or a fan case.

Further, the system comprises several active devices 41A-41C. Namely, the system 1 comprises active devices 41A for creating radial forces on the shaft 26 (and/or on the housing 45). These active devices 41A are arranged at different positions along the rotational axis 9. Some of the active devices 41A-41C may form an active device arrangement, among which, e.g., several active devices 41A-41C are arranged at the same axial position.

Further, the system 1 comprises an active device 41B for creating axial forces on the shaft 26 (and/or on the housing 45). One or more further active devices of this kind may be provided, particularly at other positions along the shaft 26.

The system 1 also comprises several, namely two, active devices 41C for creating tangential forces on the shaft 26 (and/or on the housing 45). These active devices 41C are arranged at different positions along the rotational axis 9.

In the present example, each of the active devices 41A-41C comprises one or more electric coils mounted on the housing 45. Alternatively or in addition, electric coils may be mounted on the shaft 26. Further, for example, permanent magnets can be mounted on or in the shaft adjacent the coils. An optional rotor lamination mounted around the shaft 26 rotates with the shaft 26, and comprises a ferromagnetic material such as iron. Hence, activation of the coils exerts a force on the shaft 26. For the axially acting active device 41B a disc including a ferromagnetic material as iron and/or one or more permanent magnets is fixed to the shaft 26, and coils are fixed to the housing 45 axially before and behind the disc. Thus, activation of the coils in front of or behind the disc exerts a force in one of the two directions along the rotational axis 9. An active device and/or a coil of an active device can also be located between two coaxial rotors (e.g., shafts), e.g., in order to variate the stiffness between rotor and stator.

The tangentially acting active devices 41C of the present example are designed in the form of electric motors. Indeed, the system 1 can be used as an electric engine, e.g., for aircraft 8 of FIG. 1.

The system may be part of an electric engine of a hybrid engine.

Figure 6:
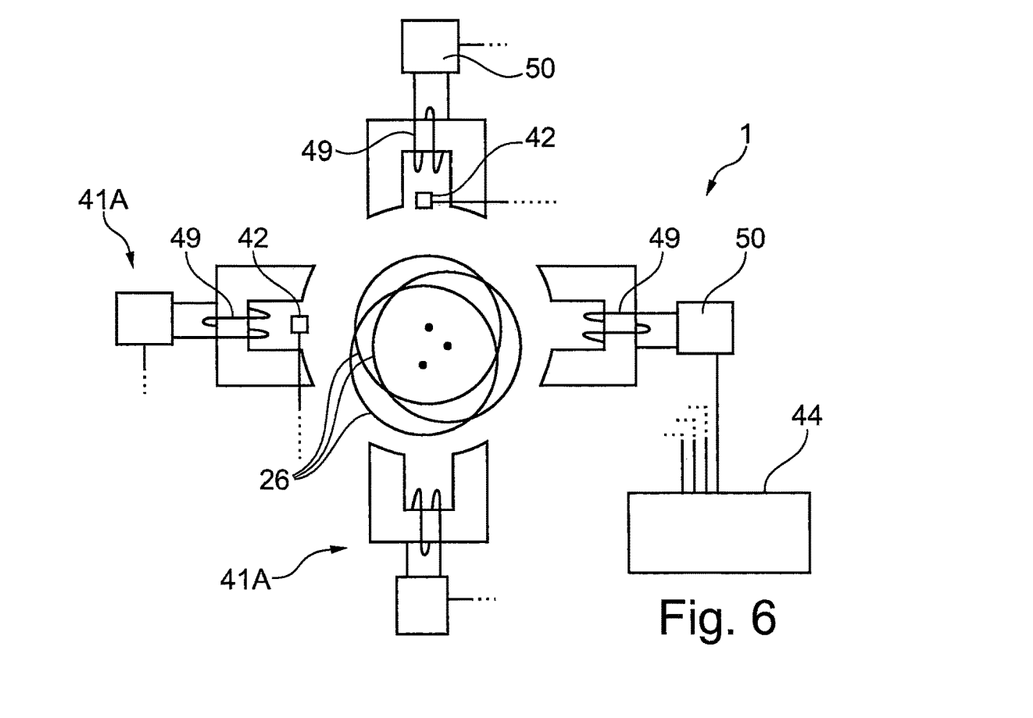
FIG. 6 is a view of the system of FIGS. 5A and 5B.

FIG. 6 shows four of the radially acting active devices 41A of FIG. 5B, which together form an active device arrangement. Each of the active devices 41A comprises an electromagnet. Each electromagnet comprises a coil 49 wound around an (optional) core, e.g., iron core. The cores are U shaped. The open ends of the U face the shaft 26. The electromagnets are arranged equidistantly around the shaft 26. Thus, in the present example, four electromagnets are provided.

Each coil 49 is electrically coupled to a current supply 50. The current supplies 50 are operatively coupled to the controller 44. The control signals of the controller 44 to the current supplies 50 result in magnetic forces acting on the shaft 26.

In FIG. 6, the shaft 26 is shown in three different deflections to illustrate a bending of the shaft 26 due to vibrations. Such bending can be counteracted by the active device 41A arrangement. If desired, however, such bending can also be effected by means of the active device 41A arrangement.

A mode of vibration is characterized by a modal frequency and a mode shape. It is numbered according to the number of half waves in the vibration. It is worth noting that different mode shapes can be exited at the same time (by multiple resonances). Also the system is able to measure the real shape of the modes in operational conditions (operational mode shapes).

It is worth noting that instead of providing an active device arrangement as shown in FIG. 6, the electromagnets can be applied in one single active device that is controlled as a whole. As another alternative, each two opposing electromagnets may be part of one active device and controlled together, independently of the other active device(s) at the same axial location.

Figure 7:
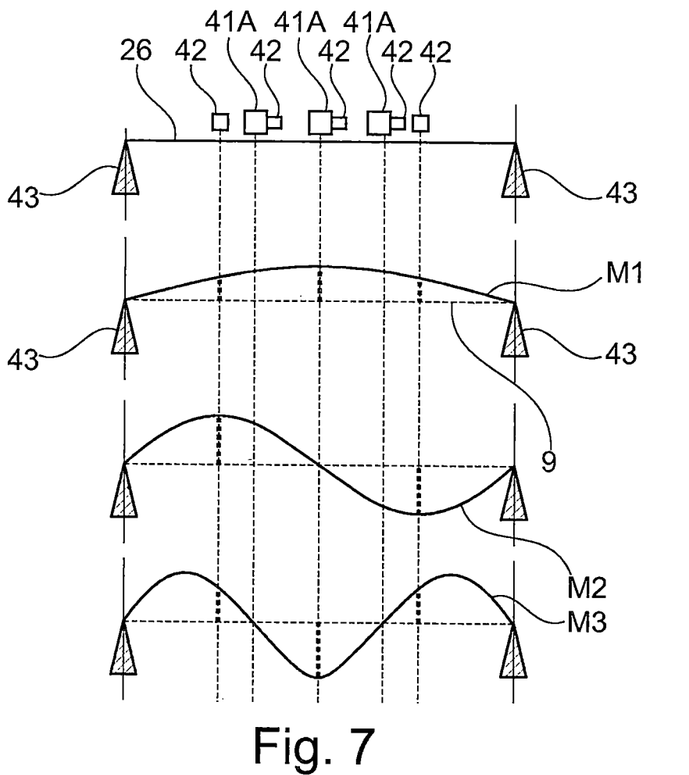
FIGS. 7 and 8 are diagrams for illustrating a performance of the system according to FIGS. 5A-6.

FIG. 7 shows the first three mode shapes of the shaft 26 with respect to its longitudinal extension. On top, the first mode shape M1 is shown, towards the bottom of the figure mode shapes M2 and M3. The shaft 26 is shown rotatably mounted on the contact bearings 43. The shaft 26 may vibrate in these (and higher) modes of vibration, and it may be in a resonance with a frequency at or close to the corresponding modal frequency. Such vibration may lead to comparably large amplitudes.

Such vibrations can be effectively counteracted when applying forces to those locations on the shaft 26 along the rotational axis 9 which are at or closest to the maxima of the deflections of the shaft 26 in the corresponding mode. In FIG. 7, three axially acting active devices 41A are shown as examples. One of these active devices 41A is arranged at the center, i.e., at the maximum deflection in mode M1. Further, sensors 42 are arranged at different locations along the rotational axis 9. Here, five sensors 42 are shown as an example. At each of the active devices 41A, one of the sensors 42 is arranged. Two further sensors 42 are arranged further towards the bearings 43. Specifically, two active devices 41A, and sensors 42, correspondingly, are arranged at the nodes of the third mode shape M3. The two further sensors 42 are arranged at the locations of the maxima of the second mode shape M2.

Thus, it becomes clear that all three active devices 41A may be used to counteract the first mode shape M1, but the middle active device 41A will have the strongest effect, so this active device 41A is selected by the controller 44 to counteract the first mode shape M1.

However, that middle active device 41A is arranged at the node of the second mode shape M2. Therefore, it will have a diminishing effect for counteracting the second mode shape M2. For this purpose, the other two active devices 41A shown in FIG. 7 will be selected as a subset of the active devices 41A and controlled to exert forces on the shaft 26 to counteract the second mode shape M2.

In case of the third mode shape M3, the situation is opposite to the second mode shape M2. The two active devices 41A at the nodes of this mode shape M3 will have a diminishing effect against this mode shape M3. However, the middle active device 41A is arranged at the center maximum deflection of this mode shape M3 and is selected as a subset for counteracting this mode shape M3 by the controller 44.

Figure 8:
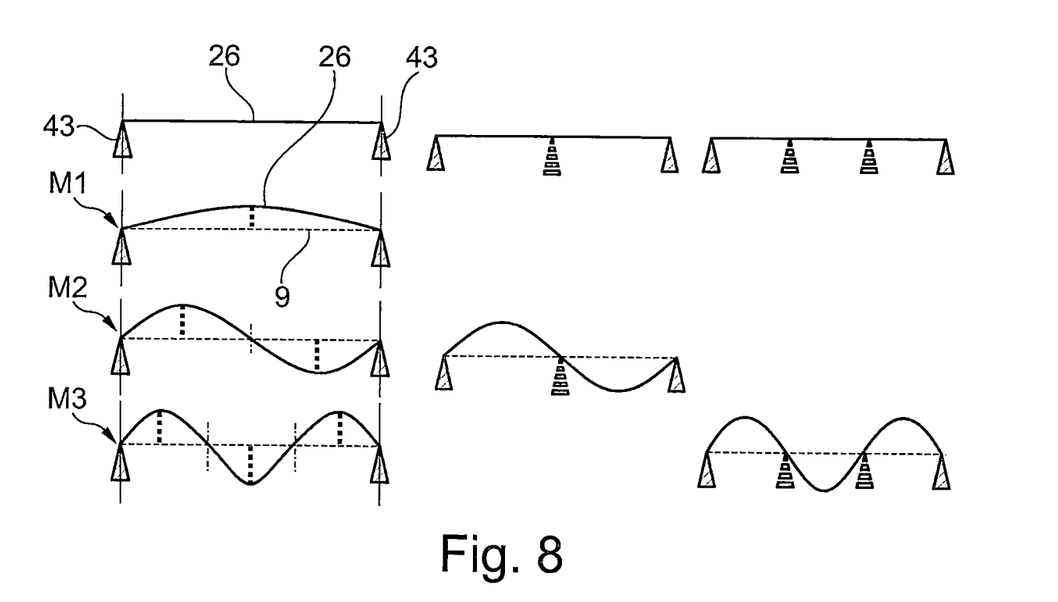

FIG. 8 illustrates, in a further simplified manner, which of the mode shapes M1-M3 can be counteracted by which of the active devices 41A, as described above. It is worth considering that in practice several mode shapes can be excited from different driving forces.

In other words, the shaft 26 has mode shapes, and the active devices 41A (as well as the sensors 42) are located at characteristic points of these mode shapes, particularly the lowest 2, 3, 4 or 5 mode shapes. The characteristic points generally are maxima and/or nodes. Maxima and nodes have the character of extreme displacements and include radial, axial and rotative displacements.

The sensors 42 in this example are proximity probes measuring the distance to the shaft 26.

Figure 9:
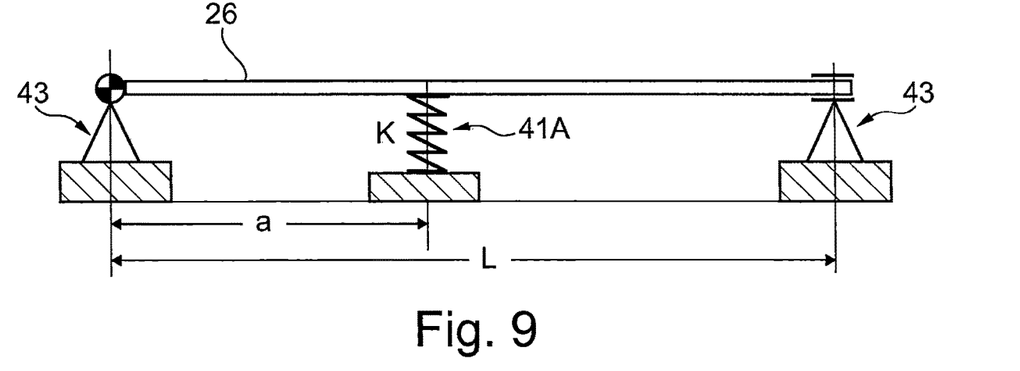
FIG. 9 illustrates the function of the system according to FIGS. 5A-6.

FIG. 9 illustrates that one or more of the bearings 43 may also be designed so as to allow rotation of the shaft 26 around an axis vertical to its longitudinal axis (corresponding to the rotational axis 9), as the bearing 43 shown in left in the figure. Alternatively or in addition one or more of the bearings 43 may be designed, as in FIG. 9, as a sliding bearing allowing an axial movement of the shaft 26, as the bearing 43 shown in the right in the figure. The bearings are displaced by a distance L. Between the bearings, an active device 41A is shown schematically as an example. The active device 41A exerts a non-contact force on the shaft 26, in this case a magnetic force. This force has the effect of a modified stiffness of the shaft 26, illustrated by K in the figure. The active device 41A is displaced from one of the bearings 43 (the left in FIG. 9) by a distance a. Therein, a is smaller than L. For example, a=L/2.

Above, the radially acting active devices 41A have been described, but the control of the axially and tangentially acting active devices 41B, 41C is correspondingly.

By modifying the stiffness of the shaft 26, its modes are mistuned, and therefore resonances can be counteracted. It is worth noting that during operation, the mode shapes may be detected by means of the sensors 42 measuring a characteristic deflection pattern. Alternatively, the controller 44 may store certain operating conditions, e.g., speed and/or power, at which certain mode shapes would occur when not counteracted by the active devices 41A-41C. Hence, the controller may selectively activate the corresponding active device 41A-41C to counteract a given mode shape M1-M3. Therefore, for example, when increasing the speed, the shaft 26 traverses several modal frequencies. By selective activation of the corresponding active device(s) 41A-41C, the corresponding mode shapes are mistuned. Thus, the system 1 allows a resonance mistuning on multiple modes.

Figure 10:
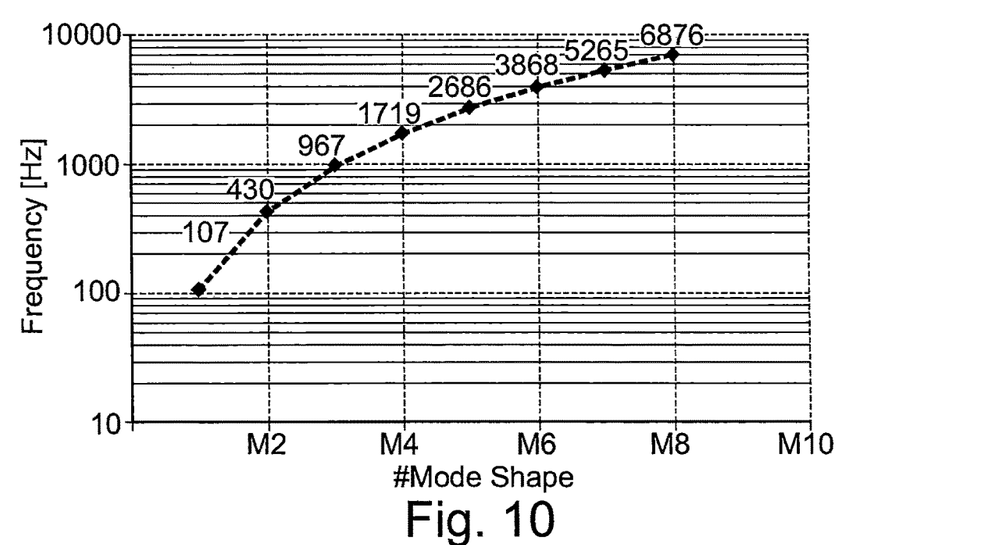
FIG. 10 is a diagram showing oscillation frequencies of an example rotor of the system of FIGS. 5A-6 at various modes.

FIG. 10 shows the lowest ten mode shapes M1-M10 and the corresponding frequencies. The system 1 allows to ride through these frequencies without exciting corresponding resonances, or only at strongly reduced amplitudes. This is possible by the distributed magnetic loads (by the active devices 41A-41C) obtained by coils integrated in the statoric cylinder housing 46 coaxial to the shaft 26. The controller 44 may perform a modal analysis, e.g., in the speed range of interest.

Optionally, the stiffness ratio between rotor (e.g., shaft 26) and stator (e.g., housing 45), or between two different parts of the rotor (shaft 26) may be used as the dimensionless most significant parameter to be modified to achieve the natural frequency mistuning by the controller 44. Further, using the tangentially acting active devices 41C, a torsional stiffness variation is possible. Even further, it is possible to use a torsional stiffness ratio between two different rotating parts as a parameter for mistuning natural frequencies. It is further worth noting that the system 1 can also be used to mistune cross-shaft resonances between the shaft 26 and another shaft. Stiffness ratio targets may be achieved by a control loop of the controller 44 using a displacement ratio of displacements (e.g. radially, axially and/or torsionally) measured by sensors 42 at two different positions (e.g., along the rotational axis 9).

In detail, the controller 44 may first define a mistuning target, e.g., multiple mode shapes. By this, a stiffness demand at several locations is calculated. Then, one or more stiffness ratios between the locations are calculated. The shaft 26 locations are measured at the sensor 42 locations. Ratios between the shaft locations at the sensor locations are calculated to identify the current mode. Optionally, a temperature correction is performed.

Further, more than one mode shape may be mistuned by the system 1 at the same time, e.g. a radial mode shape and a torsional mode shape.

It is worth noting that a damping is not the primary effect of the application of the system 1 in order to reduce vibration. Rather, the stiffness modification is the target, while damping is a secondary effect. Further, besides the conventional resonances, the system 1 can also be used to reduce rotor orbits/vibration due to gap-dependent forces. Also the monitoring of the gap dependent forces is possible.

Figure 11:
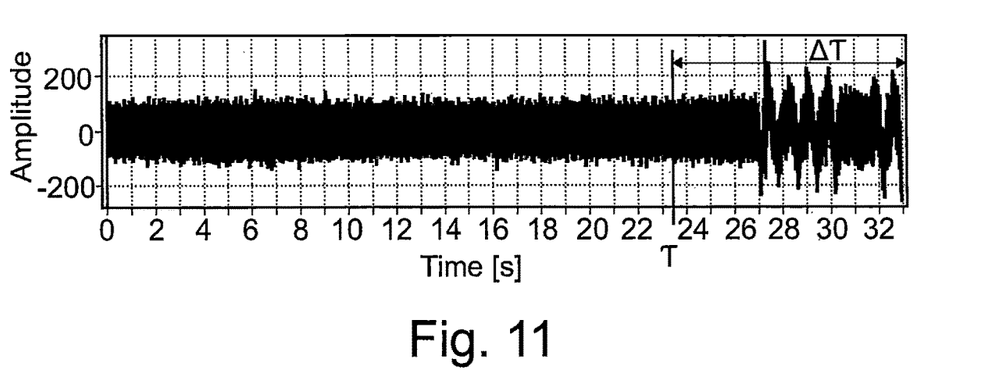
FIG. 11 is a diagram of vibration amplitudes versus time.

FIG. 11 illustrates an example of transient residual oscillation in resonance. An additional improvement is possible by activating the corresponding active device 41A-41C (or active device arrangement) already before the resonance sets in, as illustrated in FIG. 11. Therefore, by analysis of the operating conditions, and the change of the operating conditions (e.g., speed and acceleration), the controller 44 predicts an approximate point in time at which a resonance will set in, and activates the corresponding active device(s) 41A-41C at a prior point in time tau. Here, the corresponding active device(s) 41A-41C are activated for a time period delta tau. The time period delta tau may be predetermined, or it may be calculated based on the operating conditions and their change.

It is worth noting that the active devices 41A-41C do not carry the shaft 26. The active devices 41A-41C may be switched off and the shaft 26 will be carried by its mechanical bearings 43.

Thus, with the system 1 it is possible to reduce the effects of a main source, and of several sources acting at the same time, of vibration without additional heavy dampers.

Further, in addition to reducing vibrations, the system 1 can be used to excite vibrations, e.g. to de-ice the shaft and/or blades mounted thereon, e.g., a fan, or the housing 45, e.g. a fan case. Other possible applications are to counteract a combustor rumble, and to generate static and modulated loads on a test article, for instance to simulate the effect of gap-dependent forces and vibration on a journal bearing under test on a full scale rig for rig testing.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE NUMBERS

1 system
8 airplane
9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct 23 propulsive fan
24 stationary supporting structure
26 shaft
27 interconnecting shaft
28 sun gear
30 gearbox
32 planet gears
34 planet carrier
36 linkages
38 ring gear
40 linkages
41A-41C active device
42 sensor
43 bearing
44 controller
45 housing
46 rotor section
47 gearbox
48 reinforcement
49 coil
50 current supply
A core airflow
B bypass airflow
M1-M10 mode shape

The invention claimed is:

1. A system for vibration management, comprising:
a stator of a gas turbine engine;
a rotor being mounted rotatably with respect to the stator about a rotational axis;
one or more active devices adapted to apply at least one chosen from forces and moments on at least one chosen from the rotor and the stator;
at least two sensors configured for measuring vibrational parameter values with respect to two or more different positions, along the rotational axis; and
a controller adapted to provide control signals to the one or more active devices based on the vibrational parameter values of the at least two sensors and on the two or more different positions;
wherein the controller is adapted to provide the control signals to the one or more active devices based on a ratio of values at the two or more different positions.

2. The system according to claim 1, wherein at least one chosen from the rotor and the stator has at least one mode shape with at least one deflection maximum at a position along the rotational axis, wherein at least one of the one or more active devices is arranged at the position along the rotational axis.

3. The system according to claim 1, and further comprising contact bearings; wherein the rotor is rotatably mounted with respect to the stator about the rotational axis by the contact bearings, wherein the contact bearings are adapted for supporting an entire load of the rotor in operation.

4. The system according to claim 1, wherein the controller is further adapted to at least one chosen from receive and determine an indication of a change of an operating parameter versus time, to determine a point in time when a resonance condition will be met based on the operating parameter and the change of the operating parameter, and to control at least one of the one or more active devices at a predetermined time offset prior to the a determined point in time.

5. The system according to claim 1, wherein the one or more active devices includes at least two active devices, wherein the controller is adapted to detect and identify a resonance condition, to select a subset of the at least two active devices based on the identified resonance condition, and to provide control signals to a subset of the at least two active devices, the subset including at least one of the at least two active devices.

6. The system according to claim 1, wherein the one or more active devices includes at least two active devices, wherein the controller is further adapted to select a subset of the at least two active devices based on an operating parameter value, and to provide control signals to the subset of the at least two active devices, the subset including at least one of the at least two active devices.

7. The system according to claim 1, wherein the controller is adapted to provide control signals to at least one of the one or more active devices to excite a vibration of the rotor.

8. The system according to claim 1, wherein the controller is adapted to provide control signals to at least one of the one or more active devices to apply the forces on at least one chosen from the rotor and the stator based on a target stiffness of the at least one chosen from the rotor and the stator.

9. The system according to claim 1, wherein the forces that the one or more active devices are adapted to apply are non-contact forces.

10. The system according to claim 1, wherein at least one of the one or more active devices is adapted to exert at least one chosen from radial and axial forces with respect to the rotational axis.

11. The system according to claim 1, wherein at least one of the one or more active devices is adapted to exert tangential forces with respect to the rotational axis.

12. The system according to claim 11, wherein each of two or more of the one or more active devices is adapted to exert tangential forces on the rotor with respect to the rotational axis.

13. An engine for an aircraft comprising the system according to claim 1.

14. The system according to claim 1, wherein the two values are based on the vibrational parameters or values of a stiffness of at least one chosen from the rotor and the stator, wherein the vibration parameter values are based on a structure of an assembly including the rotor and the stator, adjusted to optimized levels, the ratio numerically calculated from models and look-up tables.

15. A system for vibration management, comprising:
a stator of a gas turbine engine;
a rotor being mounted rotatably with respect to the stator about a rotational axis;
at least two active devices arranged at two or more different positions, each of the at least two active devices being configured to apply at least one chosen from forces and moments on at least one chosen from the rotor and on the stator; and
a controller adapted to receive at least one chosen from operating parameter values and vibrational parameter values and to provide control signals to the at least two active devices based on the at least one chosen from operating parameter values and the vibrational parameter values, and on the two or more different positions; and
wherein the controller is adapted to provide the control signals to the at least two active devices based on a ratio of values at the two or more different positions.

16. The system according to claim 15, wherein the two values are based on the vibrational parameters or values of a stiffness of at least one chosen from the rotor and the stator, wherein the vibration parameter values are based on a structure of an assembly including the rotor and the stator, adjusted to optimized levels, the ratio numerically calculated from models and look-up tables.

\* \* \* \* \*